US011467988B1

(12) United States Patent
Hammarlund et al.

(10) Patent No.: US 11,467,988 B1
(45) Date of Patent: Oct. 11, 2022

(54) MEMORY FETCH GRANULE

(71) Applicant: Apple Inc., Cupertino, CA (US)

(72) Inventors: Per Hakan Hammarlund, Sunnyvale, CA (US); Liran Fishel, Raanana (IL); Roman Gindin, Hod Hasharon (IL)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/230,490

(22) Filed: Apr. 14, 2021

(51) Int. Cl.
*G06F 13/00* (2006.01)
*G06F 13/16* (2006.01)
*G06F 9/30* (2018.01)
*G06F 12/02* (2006.01)

(52) U.S. Cl.
CPC ...... *G06F 13/1668* (2013.01); *G06F 9/30047* (2013.01); *G06F 12/0292* (2013.01); *G06F 13/1605* (2013.01)

(58) Field of Classification Search
CPC .. G06F 13/1668; G06F 13/00; G06F 13/1605; G06F 12/00; G06F 12/0292; G06F 9/30047
See application file for complete search history.

(56) References Cited

U.S. PATENT DOCUMENTS

| | | | | |
|---|---|---|---|---|
| 9,239,784 B1* | 1/2016 | Haghighi | ............ | G06F 12/0246 |
| 9,432,298 B1* | 8/2016 | Smith | ..................... | H04L 47/34 |
| 10,353,747 B2 | 7/2019 | Luan et al. | | |
| 2008/0244135 A1 | 10/2008 | Akesson et al. | | |
| 2013/0268728 A1* | 10/2013 | Ramanujan | ......... | G06F 12/0808 |
| | | | | 711/143 |
| 2014/0297919 A1* | 10/2014 | Nachimuthu | ....... | G06F 12/0891 |
| | | | | 711/102 |
| 2020/0278941 A1 | 9/2020 | Bavishi | | |

* cited by examiner

*Primary Examiner* — Tuan V Thai
(74) *Attorney, Agent, or Firm* — Rory D. Rankin; Kowert, Hood, Munyon, Rankin & Goetzel, P.C

(57) ABSTRACT

Systems, apparatuses, and methods for implementing a memory fetch granule for real-time agents are described. A computing system includes a plurality of real-time agents coupled to memory via an interconnect fabric and a memory controller. The efficiency of the memory controller is determined by the number of bank groups in the memory devices coupled to the memory controller. A memory fetch granule is defined for the memory controller based on the amount of data that can be accessed in parallel on the memory device in back-to-back access cycles. Each real-time agent accumulates memory requests for sequential physical addresses until the amount of data referenced by the requests reaches the size of the memory fetch granule. Once the memory fetch granule is reached, the real-time agent sends the requests to the memory controller via the fabric. This helps to ensure that the requests will arrive at the memory controller near enough to each other to get grouped together.

20 Claims, 10 Drawing Sheets

MEMORY FETCH GRANULE

BACKGROUND

Technical Field

Embodiments described herein relate to digital systems and, more particularly, to techniques for memory controllers to efficiently use bandwidth.

Description of the Related Art

Quality of Service (QoS) is a policy that enables a computing system to provide required performance for all agents in the system. The policy can be defined as a set of requirements that each agent, fabric component, and memory subsystem component should follow to ensure the proper memory service level of each agent in the system. As used herein, the term "agent" is defined as a component generating traffic within a computing system. Non-limiting examples of agents include a central processing unit (CPU), graphics processing unit (GPU), display, and so on. QoS is a set of mechanisms for guaranteeing fabric, memory controller, and memory bandwidth over a bounded and predefined period of time.

The QoS goal is provide every agent in the system the appropriate service from the memory subsystem. This service includes at least providing sufficient bandwidth in a given time window, low latency access to memory, maintaining memory ordering rules, and preventing head of line blocking. Real-time (RT) traffic has a stringent requirement where required amount of bandwidth should be guaranteed with bounded latency to prevent functional failures such as display underrun. In order to satisfy the bandwidth requirements of all the RT agents, it is important that the memory controllers efficiently use bandwidth.

Various challenges can be encountered when trying to ensure that the memory controllers are efficiently using the available memory bandwidth. For example, some computing systems have a distributed memory subsystem with multiple RT agents and multiple memory controllers without a single point of arbitration and decision making. In such a system, lower priority RT agents can interfere with a higher priority RT agent. Also, multiple RT streams can access the same memory channel creating head of line blocking and effectively reducing the available RT memory bandwidth for a given stream. Additionally, an inefficient memory access pattern to the memory channels can significantly reduce the channel throughput.

SUMMARY

Systems, apparatuses, and methods for implementing a memory fetch granule are contemplated.

In one embodiment, a variety of different type of traffic traverses a communication fabric connecting together a plurality of agents and one or more endpoints (e.g., memory device). The different types of traffic may include real-time (RT) traffic. In one embodiment, satisfying RT guarantees in the system requires a known worst case amount of memory bandwidth from each memory device. This worst case memory bandwidth is determined by how evenly data is distributed over the banks and bank groups of a memory device (e.g., dynamic random-access memory (DRAM) device) in the most extreme conditions. In order to guarantee sufficient RT bandwidth from a DRAM channel, RT agents shall access data at a granularity larger than a cache line. This data access granularity is referred to herein as a "memory fetch granule".

In one embodiment, the memory controller notifies the RT agents of a size of the memory fetch granule. In another embodiment, the size of the memory fetch granule is programmed into the RT agents by software. In other embodiments, other techniques for informing the RT agents of the memory fetch granule size can be employed. The RT agents then attempt to group their memory requests together into memory fetch granules prior to sending the memory requests to memory. At arbitration points in the communication fabric, the memory fetch granule is arbitrated as a group to keep the request together. This helps to ensure that the requests will arrive at the memory controller near enough to each other to get grouped together.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
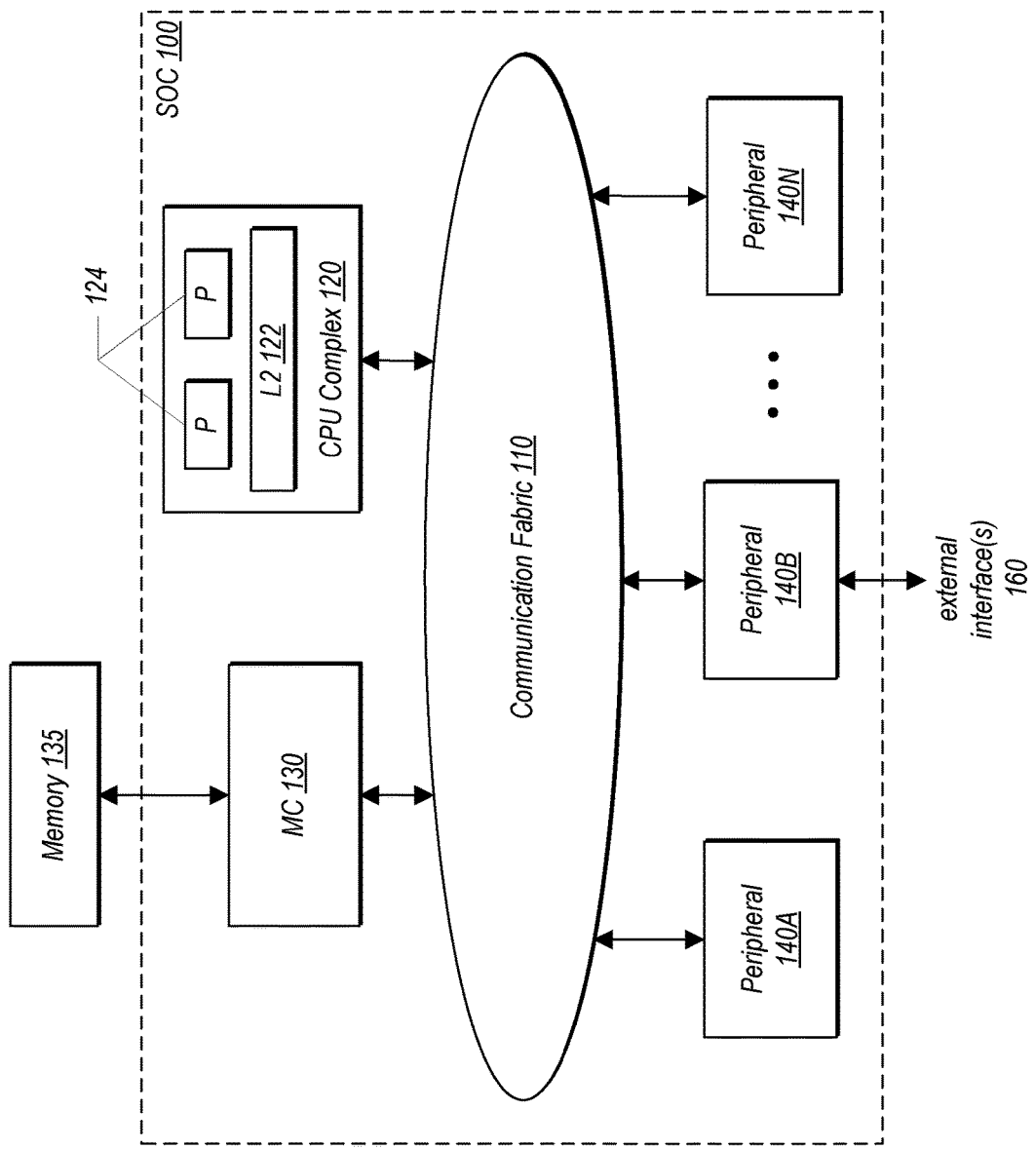
FIG. 1 is a generalized block diagram of one embodiment of a SOC.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Referring now to FIG. 1, a block diagram of one embodiment of a system-on-a-chip (SOC) is shown. SOC 100 is shown coupled to a memory 135. As implied by the name, the components of the SOC 100 may be integrated onto a single semiconductor substrate as an integrated circuit "chip". It is noted that a "chip" may also be referred to as a "die". In some embodiments, the components may be implemented on two or more discrete chips in a system. However, the SOC 100 will be used as an example herein. In the illustrated embodiment, the components of the SOC 100 include a central processing unit (CPU) complex 120, on-chip peripheral components 140A-140N (more briefly, "peripherals"), a memory controller (MC) 130, and a communication fabric 110. The components 120, 130, 140A-140N, and 150 may all be coupled to the communication fabric 110. The memory controller 130 may be coupled to the memory 135 during use, and the peripheral 140B may be coupled to an external interface 160 during use. In the illustrated embodiment, the CPU complex 120 includes one or more processors (P) 124 and a level two (L2) cache 122.

The peripherals 140A-140N may be any set of additional hardware functionality included in the SOC 100. For example, the peripherals 140A-140N may include video peripherals such as an image signal processor configured to process image capture data from a camera or other image sensor, display controllers configured to display video data on one or more display devices, graphics processing units (GPUs), video encoder/decoders, scalers, rotators, blenders, etc. The peripherals may include audio peripherals such as microphones, speakers, interfaces to microphones and speakers, audio processors, digital signal processors, mixers, etc. The peripherals may include peripheral interface controllers for various interfaces 160 external to the SOC 100 (e.g. the peripheral 140B) including interfaces such as Universal Serial Bus (USB), peripheral component interconnect (PCI) including PCI Express (PCIe), serial and parallel ports, etc. The peripherals may include networking peripherals such as media access controllers (MACs). Any set of hardware may be included.

In one embodiment, SOC 100 includes CPU complex 120. The CPU complex 120 may include one or more CPU processors 124 that serve as the CPU of the SOC 100. The CPU of the system includes the processor(s) that execute the main control software of the system, such as an operating system. Generally, software executed by the CPU during use may control the other components of the system to realize the desired functionality of the system. The processors 124 may also execute other software, such as application programs. The application programs may provide user functionality, and may rely on the operating system for lower level device control. Accordingly, the processors 124 may also be referred to as application processors.

The CPU complex 120 may further include other hardware such as the L2 cache 122 and/or an interface to the other components of the system (e.g., an interface to the communication fabric 110). Generally, a processor may include any circuitry and/or microcode configured to execute instructions defined in an instruction set architecture implemented by the processor. The instructions and data operated on by the processors in response to executing the instructions may generally be stored in the memory 135, although certain instructions may be defined for direct processor access to peripherals as well. Processors may encompass processor cores implemented on an integrated circuit with other components as a system on a chip or other levels of integration. Processors may further encompass discrete microprocessors, processor cores, and/or microprocessors integrated into multichip module implementations, processors implemented as multiple integrated circuits, and so on.

The memory controller 130 may generally include the circuitry for receiving memory operations from the other components of the SOC 100 and for accessing the memory 135 to complete the memory operations. The memory controller 130 may be configured to access any type of memory 135. For example, the memory 135 may be static random access memory (SRAM), dynamic RAM (DRAM) such as synchronous DRAM (SDRAM) including double data rate (DDR, DDR2, DDR3, etc.) DRAM. Low power/mobile versions of the DDR DRAM may be supported (e.g. LPDDR, mDDR, etc.). The memory controller 130 may include queues for memory operations, for ordering (and potentially reordering) the operations and presenting the operations to the memory 135. The memory controller 130 may further include data buffers to store write data awaiting write to memory and read data awaiting return to the source of the memory operation.

The efficiency of memory controller 130 is determined by the number of bank groups in the memory devices which make up memory 135. Accordingly, in one embodiment, memory controller 130 defines a memory fetch granule for use by real-time agents when generating and sending memory requests which target memory 135 to memory controller 130. A memory fetch granule is defined based on the amount of data that can be accessed in parallel on in memory 135 in back-to-back access cycles. Each real-time agent accumulates memory requests for sequential physical addresses until the amount of data referenced by the requests reaches the size of the memory fetch granule (unless the agent otherwise indicates that it has reached the end of a memory fetch granule, as discussed below). Once the size of the memory fetch granule is reached, the real-time agent sends the requests to the memory controller 130 via the fabric 110. This helps to ensure a high memory bandwidth efficiency is maintained by memory controller 130.

The communication fabric 110 may be any communication interconnect and protocol for communicating among the components of the SOC 100. The communication fabric 110 may be bus-based, including shared bus configurations, cross bar configurations, and hierarchical buses with bridges. The communication fabric 110 may also be packet-based, and may be hierarchical with bridges, cross bar, point-to-point, or other interconnects. It is noted that the number of components of the SOC 100 (and the number of subcomponents for those shown in FIG. 1, such as within the CPU complex 120) may vary from embodiment to embodiment. There may be more or fewer of each component/subcomponent than the number shown in FIG. 1.

Figure 2:
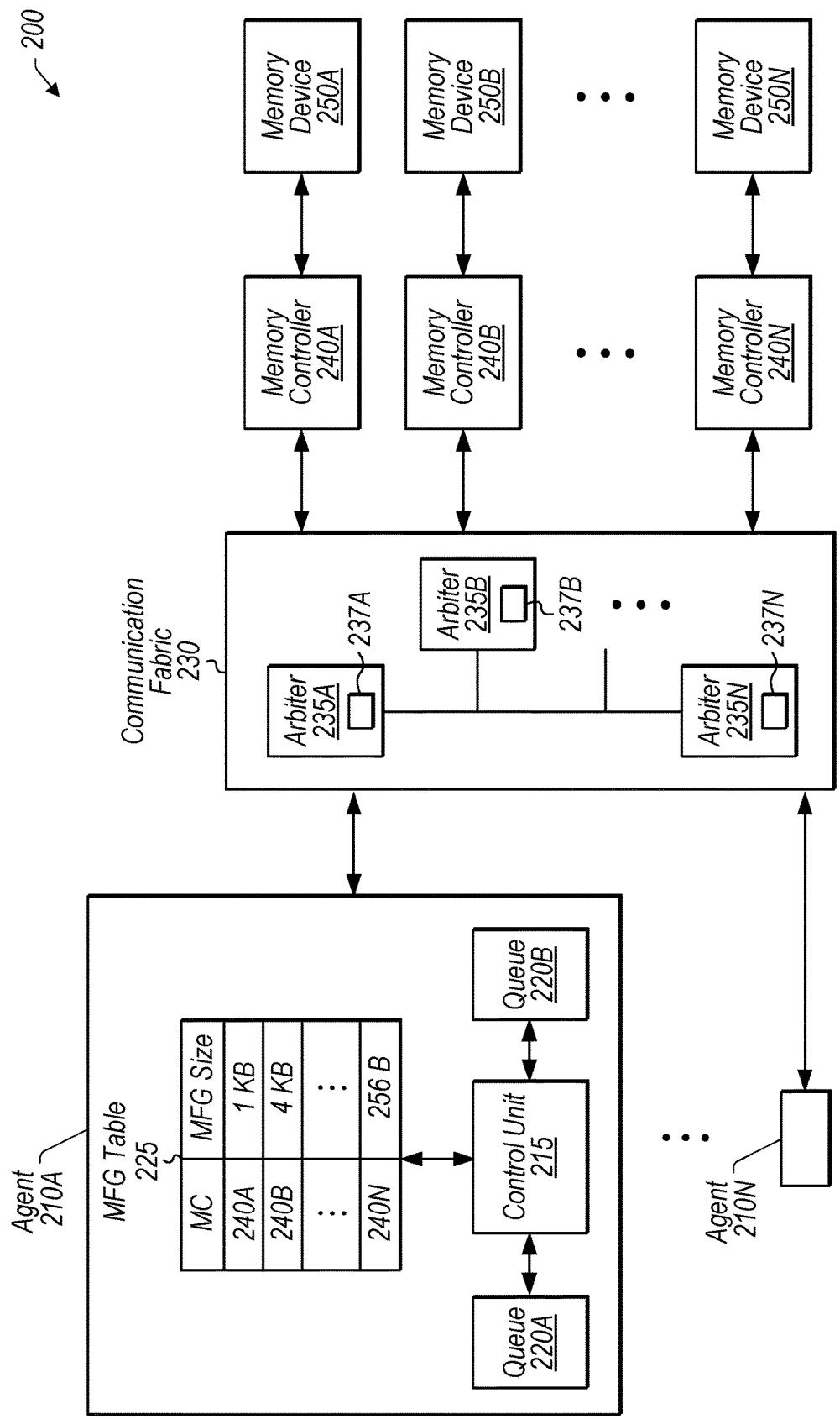
FIG. 2 is a generalized block diagram illustrating one embodiment of a system with multiple memory controllers.

Turning to FIG. 2, an embodiment of a block diagram of a system 200 with multiple memory controllers 240A-N is illustrated. As shown, system 200 includes at least agents 210A-N, communication fabric 230, memory controllers 240A-N, and memory devices 250A-N. System 200 may include any number of other components which are not shown to avoid obscuring the figure. Agents 210A-N are representative of any number and type of real-time agents generating real-time traffic. Each agent 210A-N can generate and/or send a plurality of different data streams targeting different memory controllers 240A-N. While only agent 210A is shown in an expanded form, it is noted that agent 210N, and any number of other agents, may include similar components and a similar structure to agent 210A. Agent 210A includes at least control unit 215, queues 220A-B, and memory fetch granule (MFG) table 225. Agent 210A can also include other components such as a processor, cache, and/or other circuitry. Control unit 215 may be implemented using any combination of circuitry and/or program instructions. It is noted that control unit 215 may also be referred to as an arbiter.

In one embodiment, agent 210A groups together real-time memory requests in memory fetch granule sized chunks, with the size of the memory fetch granule varying according to the memory controller 240A-N targeted by the requests. For example, agent 210A attempts to accumulate a number of real-time memory requests targeting memory coupled to a given memory controller 240A-N based on the memory fetch granule corresponding to that given memory controller 240A-N. This accumulation of memory requests is performed prior to sending the memory requests to the given memory controller via communication fabric 230. It is noted that in some cases, an agent will not have enough data for a full memory fetch granule and instead will send a smaller data chunk. In these cases, the agent will include an indication that the smaller data chunk should be forwarded and processed as is. Any type of indication can be used to indicate that less than a memory fetch granule is being sent, with the type of indication varying according to the embodiment.

While memory requests are being generated and/or received from another component, the requests are buffered in queues 220A-B which are representative of any number of queues. Control unit 215 queries MFG table 225 to determine the memory fetch granule for a given memory controller 240A-N. Each memory controller 240A-N may have a different memory fetch granule in one embodiment. In one embodiment, the memory fetch granule is based on the specific technology of the memory device(s) coupled to the memory controller. For example, the memory fetch granule is calculated based on the amount of data that can be accessed in parallel in a single access cycle. This parallel access capability is determined by the number of memory banks, the size of each memory bank, and how many memory banks can be accessed simultaneously. As the memory devices coupled to the different memory controller 240A-N may vary, so too may the memory fetch granule vary from memory controller to memory controller. As shown in MFG table 225, memory controller 240A has a memory fetch granule size of 1 kilobyte (KB), memory controller 240B has a memory fetch granule size of 4 KB, and memory controller 240N has a memory fetch granule size of 256 bytes (B). These memory fetch granule sizes are merely indicative of one particular embodiment. In some embodiments, the memory fetch granule sizes may be the same for two or more of memory controllers 240A-N.

In one embodiment, communication fabric 230 includes arbiters 235A-N which are representative of any number of arbiters. It is noted that arbiters 235A-N may also be referred to as switches 235A-N. Requests generated by agents 210A-N may traverse any number of arbiters 235A-N on their way to the target memory controller 240A-N. Each arbiter 235A-N includes a MFG table 237A-N, respectively. Each MFG table 237A-N may be structured in a similar fashion to MFG table 225. In one embodiment, each memory controller 240A-N conveys an indication of its memory fetch granule to agents 210A-N and arbiter 235A-N. This may occur at system start-up in one embodiment. In another embodiment, software programs MFG tables 225 and 237A-N based on a knowledge of the memory technology of memory devices 250A-N coupled to memory controllers 240A-N.

Figure 3:
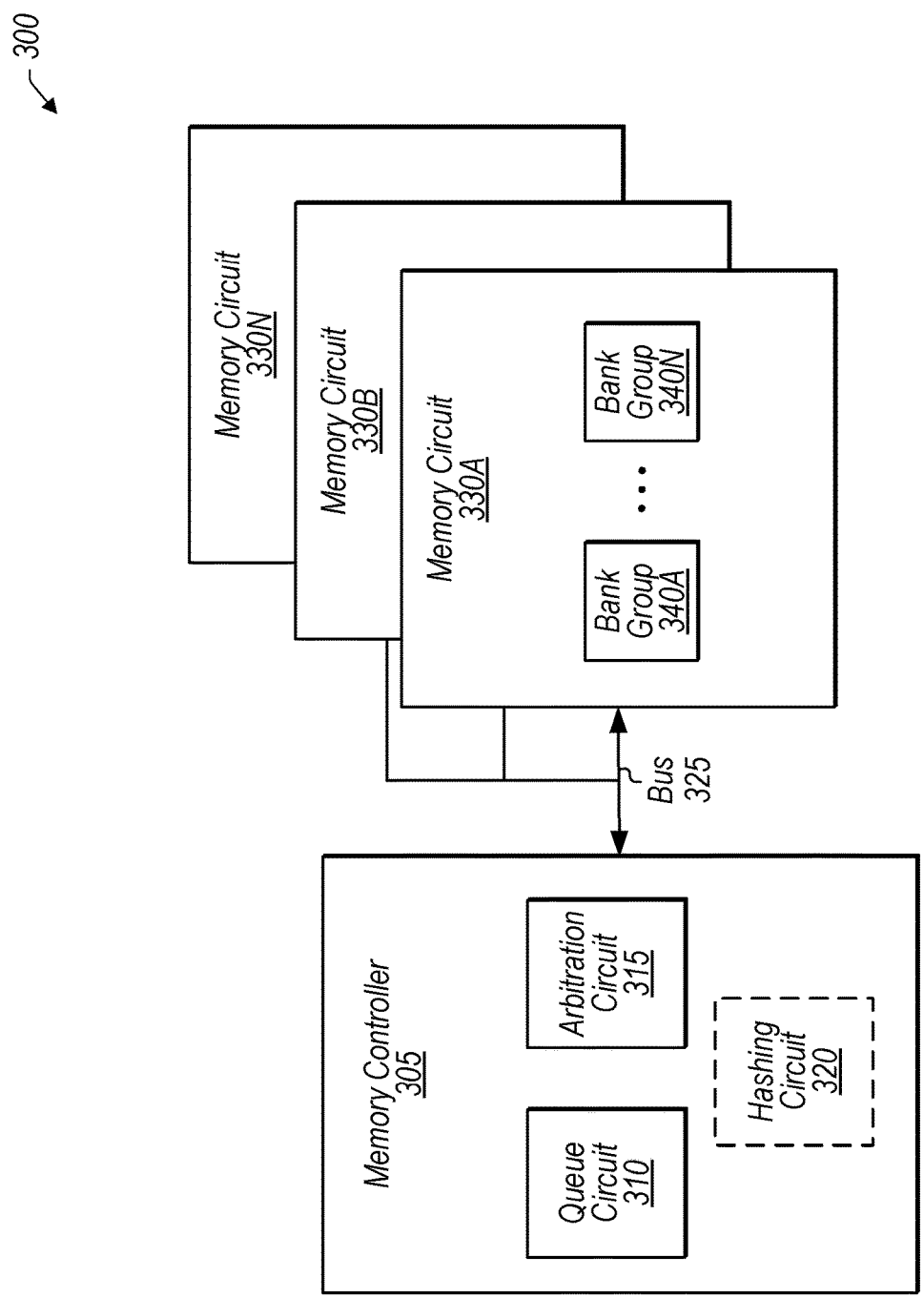
FIG. 3 is a block diagram of one embodiment of a memory system.

Referring now to FIG. 3, a block diagram of one embodiment of a memory system 300 is shown. In one embodiment, system 300 includes memory controller 305 and a plurality of memory circuits 330A-N. Memory circuits 330A-N are representative of any number of memory circuits, with each memory circuit having any number of bank groups 340A-N. Memory circuits 330A-N may be implemented using any of various memory technologies. Memory circuits 330A-N may need to be refreshed periodically if implemented as dynamic random-access memory (DRAM). Each bank group 340A-N includes any number of memory banks, with the number of banks per bank group varying according to the memory device technology. For example, in one embodiment, if memory circuits 330A-N are implemented using double data rate 5 synchronous DRAM (DDR5 SDRAM), then there would be four banks per bank group 340A-N. Other memory device technology may be structured with other numbers of banks per bank groups 340A-N. Memory controller 305 communicates with memory circuits 330A-N via bus 325.

In one embodiment, memory controller 305 includes at least queue circuit 310, arbitration circuit 315, and optional hashing circuit 320. Queue circuit 310 stores requests received by memory controller 305 from various agents. Queue circuit 310 may include any number of separate queues. Arbitration circuit 315 selects which requests are to be sent to access certain memory bank groups 340A-N. Arbitration circuit 315 may attempt to spread out access requests to different banks of memory circuits 330A-N as there may be a delay between consecutive accesses to different pages of the same bank. In one embodiment, arbitration circuit 315 uses quality of service (QoS) information, memory fetch granule (MFG), and other information to determine which requests to send to memory circuits 330A-N. The MFG may be calculated for memory circuits 330A-N based on the size of banks in bank groups 340A-N and on the amount of data that is capable of being accessed in a parallel fashion in a single access cycle. Optional hashing circuit 320 generates hashes of the addresses of requests to attempt to spread sequential physical addresses to multiple different memory circuits 330A-N to increase the efficiency of accesses to memory circuits 330A-N. In some embodiments, hashing circuit 320 is included within memory controller 305 while in other embodiments, hashing circuit 320 is omitted from memory controller 305. Alternatively, hashing circuit 320 is included within memory controller 305 but can be disabled for a particular mode. Also, it should be appreciated that memory controller 305 may include other circuits which are not shown in FIG. 3.

Figure 4:
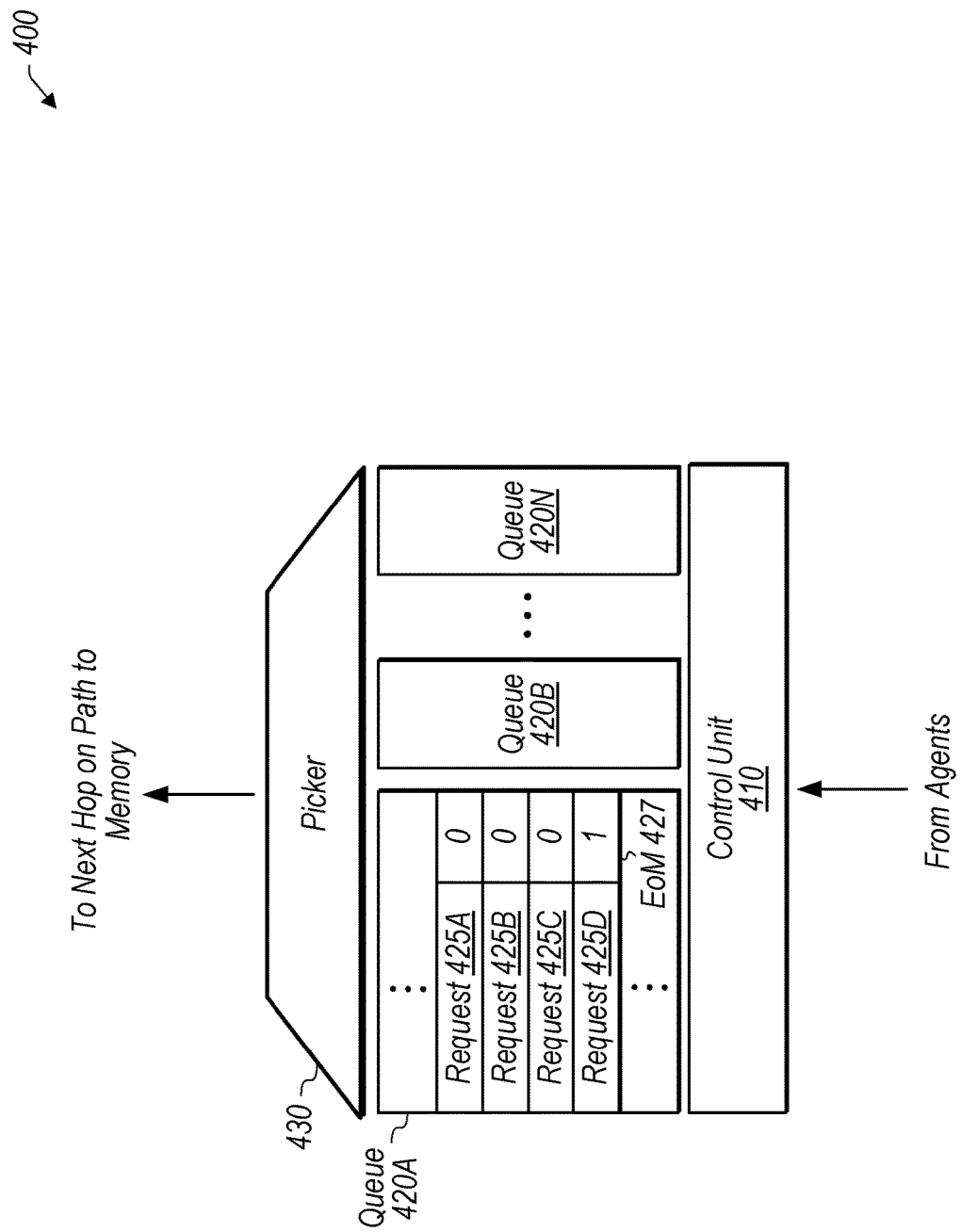
FIG. 4 is a block diagram of one embodiment of an arbiter.

Turning now to FIG. 4, a block diagram of one embodiment of an arbiter 400 is shown. In one embodiment, arbiter 400 includes at least control unit 410, queues 420A-N, and picker 430. It is noted that arbiter 400 may include other components which are not shown to avoid obscuring the figure. In one embodiment, control unit 410 enqueues received memory requests in queues 420A-N, which are representative of any number of queues. Picker 430 selects requests from queues 420A-N for forwarding to the next hop on the path to memory. Picker 430 may use any suitable arbitration scheme for determining which request has a higher priority for forwarding to memory than the other requests. It is noted that arbiter 400 can include similar components for the response path flowing from memory back to the agents. In one embodiment, arbiter 400 is located in a communication fabric (e.g., fabric 110 of FIG. 1). In other embodiments, arbiter 400 may be located at other points within a computing system (e.g., system 200 of FIG. 1).

Queues 420A-N may include any organization of queues, with different queues storing different types of requests based on various criteria. For example, queues 420A-N may include separate queues for reads and writes, separate queues for different types of traffic. For example, in one embodiment, traffic can be divided into the three traffic classes of real-time (RT), low-latency (LLT), and best-effort (BULK), each having its own queue 420A-N. These three traffic classes can be implemented as three virtual channels (VC). When control unit 410 receives a request from a given agent, control unit 410 determines which queue to store the request in based on the organization of queues 420A-N and the specific characteristics of the request.

As shown, queue 420A stores requests 425A-D, which are representative of a memory fetch granule worth of requests. In this case, the size of the memory fetch granule (MFG) is equal to the data targeted by requests 425A-D. It is assumed for the purposes of this discussion that a RT agent generated requests 425A-D which are traversing arbiter 400 on the path to memory. When the RT agent generates requests 425A-C, these requests do not include an end of MFG (EoM) flag as shown with the "0" bits in the EoM field 427 of their entries in queue 420A. Since request 425D is the last request of the MFG, the RT agent tags request 425D with the EoM flag. This is denoted with the "1" bit in the EoM field 427 of the entry in queue 420A for request 425D. In one embodiment, when picker 430 selects request 425A for forwarding, picker 430 will continue to select requests 425B-D as credits become available until the EoM flag is detected for request 425D. At that point, picker 430 is free to select another request for forwarding on the path to memory.

Figure 5:
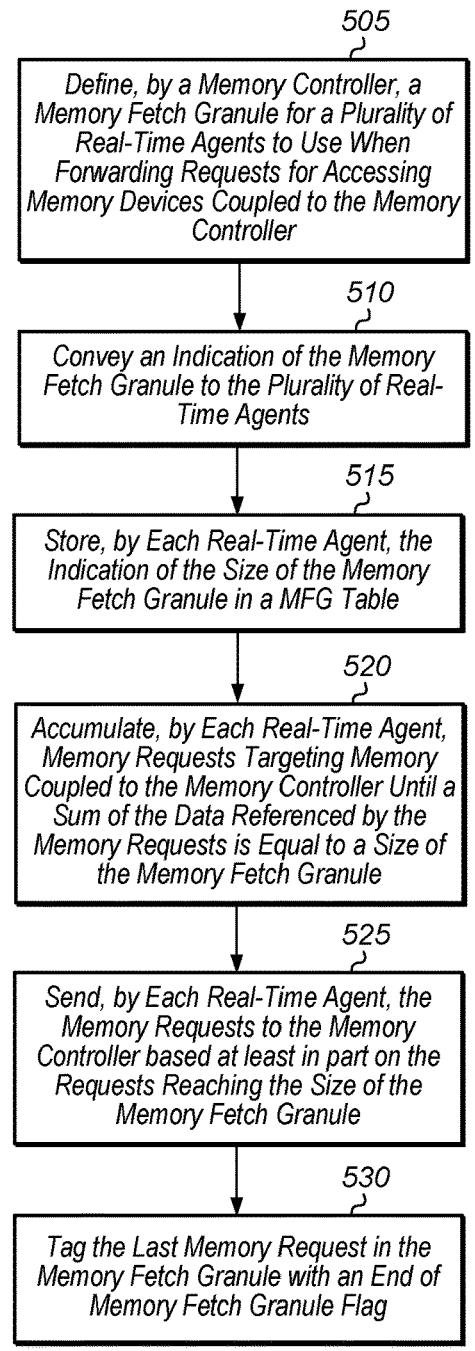
FIG. 5 is a flow diagram of one embodiment of a method for implementing a memory fetch granule.

Turning now to FIG. 5, a generalized flow diagram of one embodiment of a method 500 for implementing a memory fetch granule is shown. For purposes of discussion, the steps in this embodiment (as well as for FIGS. 6-9) are shown in sequential order. However, in other embodiments some steps may occur in a different order than shown, some steps may be performed concurrently, some steps may be combined with other steps, and some steps may be absent.

A memory controller defines a memory fetch granule for a plurality of real-time agents to use when forwarding requests for accessing memory devices coupled to the memory controller (block 505). In one embodiment, the memory fetch granule is calculated based on the memory technology of the memory devices coupled to the memory controller. Specifically, in one embodiment, the parallel accessibility of the memory device determines the memory fetch granule. For example, if a given memory device coupled to the memory controller has four memory bank groups each of which can be accessed at a granularity of 256 bytes per access, then the memory fetch granule would be defined as 1 kilobyte (KB) which is equal to the access granularity (256 bytes) multiplied by the number of memory bank groups.

The memory controller conveys an indication of the memory fetch granule to the plurality of real-time agents (block 510). For example, continuing with the above scenario, the memory controller would convey an indication that the size of the memory fetch granule is 1 KB to the plurality of real-time agents. In some embodiments, the memory controller also conveys the indication of the size of the memory fetch granule to arbiters and/or other components traversed by the requests on the way to memory.

In response to receiving the indication of the memory fetch granule, each real-time agent stores the indication of the size of the memory fetch granule in a MFG table (block 515). For example, a first real-time agent stores the indication of the size of the memory fetch granule in a first MFG table local to the first real-time agent, a second real-time agent stores the indication of the size of the memory fetch granule in a second MFG table local to the second real-time agent, and so on. In other embodiments, the indication of the size of the memory fetch granule can be stored in other locations.

Also, after receiving the indication of the memory fetch granule, each real-time agent accumulates memory requests targeting memory coupled to the memory controller until a sum of the data referenced by the memory requests is equal to a size of the memory fetch granule (block 520). One example of a method for implementing block 520 is described in further detail below in the discussion of method 600 (of FIG. 6). Next, each real-time agent sends the memory requests to the memory controller based at least in part on the requests reaching the size of the memory fetch granule (block 525). Also, the last memory request in the memory fetch granule is tagged with an end of memory fetch granule flag (block 530). After block 530, method 500 ends.

Figure 6:
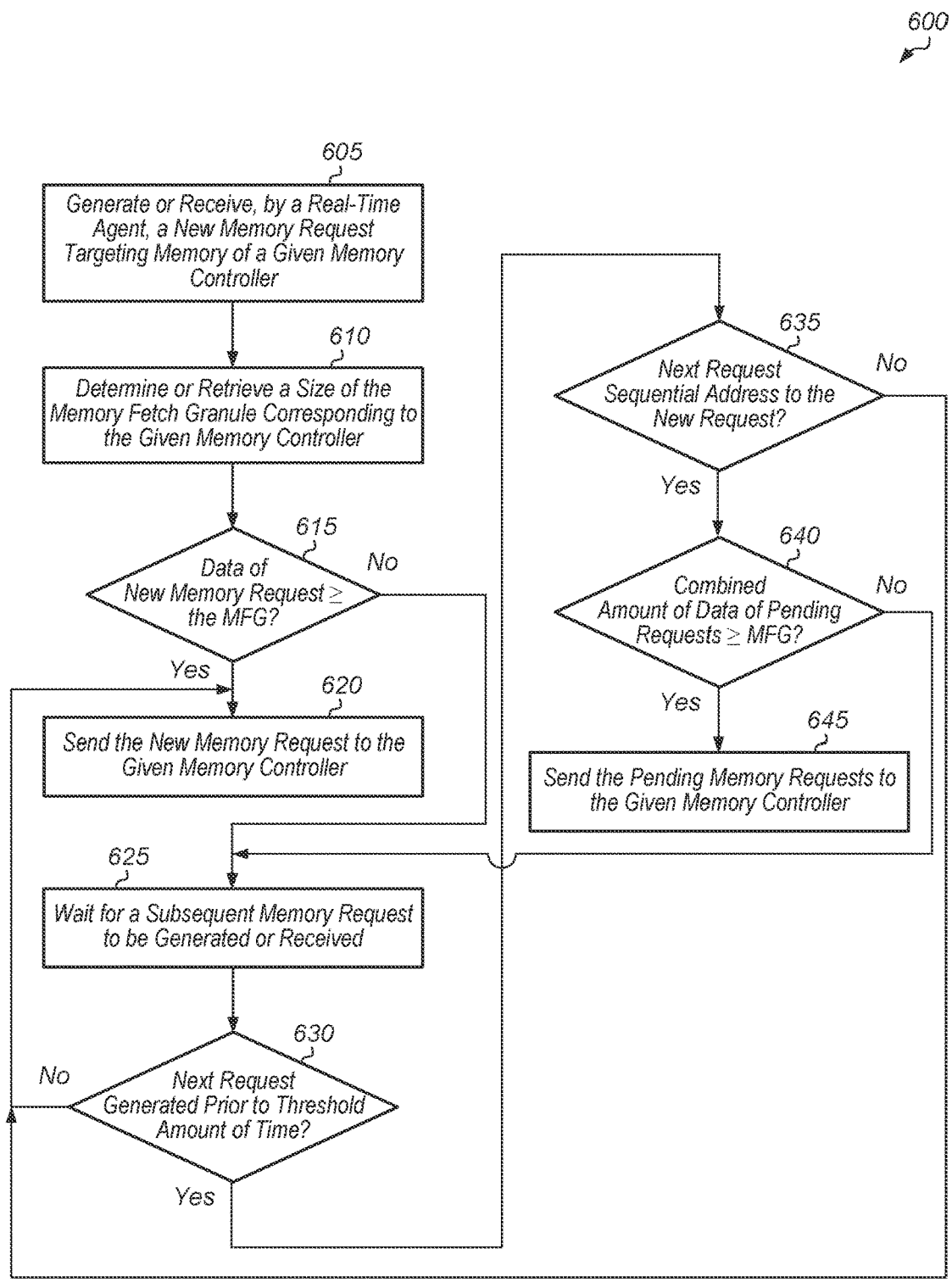
FIG. 6 is a flow diagram of one embodiment of a method for a real-time agent operating under the constraints of a memory fetch granule.

Referring now to FIG. 6, one embodiment of a method 600 for a real-time agent operating under the constraints of a memory fetch granule is shown. A real-time agent generates or receives a new memory request targeting memory of a given memory controller (block 605). The real-time agent determines or retrieves a size of the memory fetch granule corresponding to the given memory controller (block 610). In one embodiment, the memory fetch granule is stored in a MFG table (e.g., MFG table 225 of FIG. 2). In other embodiments, the memory fetch granule is stored in other locations or determined in other suitable manners.

Next, if the amount of data referenced by the new memory request is greater than or equal to the memory fetch granule (MFG) (conditional block 615, "yes" leg), then the real-time agent sends the new memory request to the given memory controller (block 620). After block 620, method 600 ends. Otherwise, if the amount of data referenced by the new memory request is less than the memory fetch granule (MFG) (conditional block 615, "no" leg), then the real-time agent waits for a subsequent memory request to be generated or received (block 625). If a threshold amount of time elapses prior to the subsequent memory request being generated or received (conditional block 630, "yes" leg), then the real-time agent sends the new memory request to the memory controller (block 620). The threshold amount of time may vary from embodiment to embodiment, and the threshold amount of time may be programmable by software.

If the subsequent memory request is generated or received prior to the threshold amount of time elapsing (conditional block 630, "no" leg), then if the subsequent memory request is not to a sequential address of the address referenced by the new memory request (conditional block 635, "no" leg), then the real-time agent sends the new memory request to the memory controller (block 620). After block 620, method 600 ends.

Otherwise, if the subsequent memory request is to a sequential address of the address referenced by the new memory request (conditional block 635, "yes" leg), then the real-time agent determines if the combined amount of data referenced by the pending memory requests (e.g., the new memory request and the subsequent memory request) is greater than or equal to the memory fetch granule (conditional block 640). If the combined amount of data referenced by the pending memory requests is greater than or equal to the size of the memory fetch granule (conditional block 640, "yes" leg), then the real-time agent sends the pending memory requests to the memory controller (block 645). If the combined amount of data referenced by the pending memory requests is greater than or equal to the size of the memory fetch granule (conditional block 640, "no" leg), then method 600 returns to block 625 with the real-time agent waiting for a subsequent memory request to be generated or received.

Figure 7:
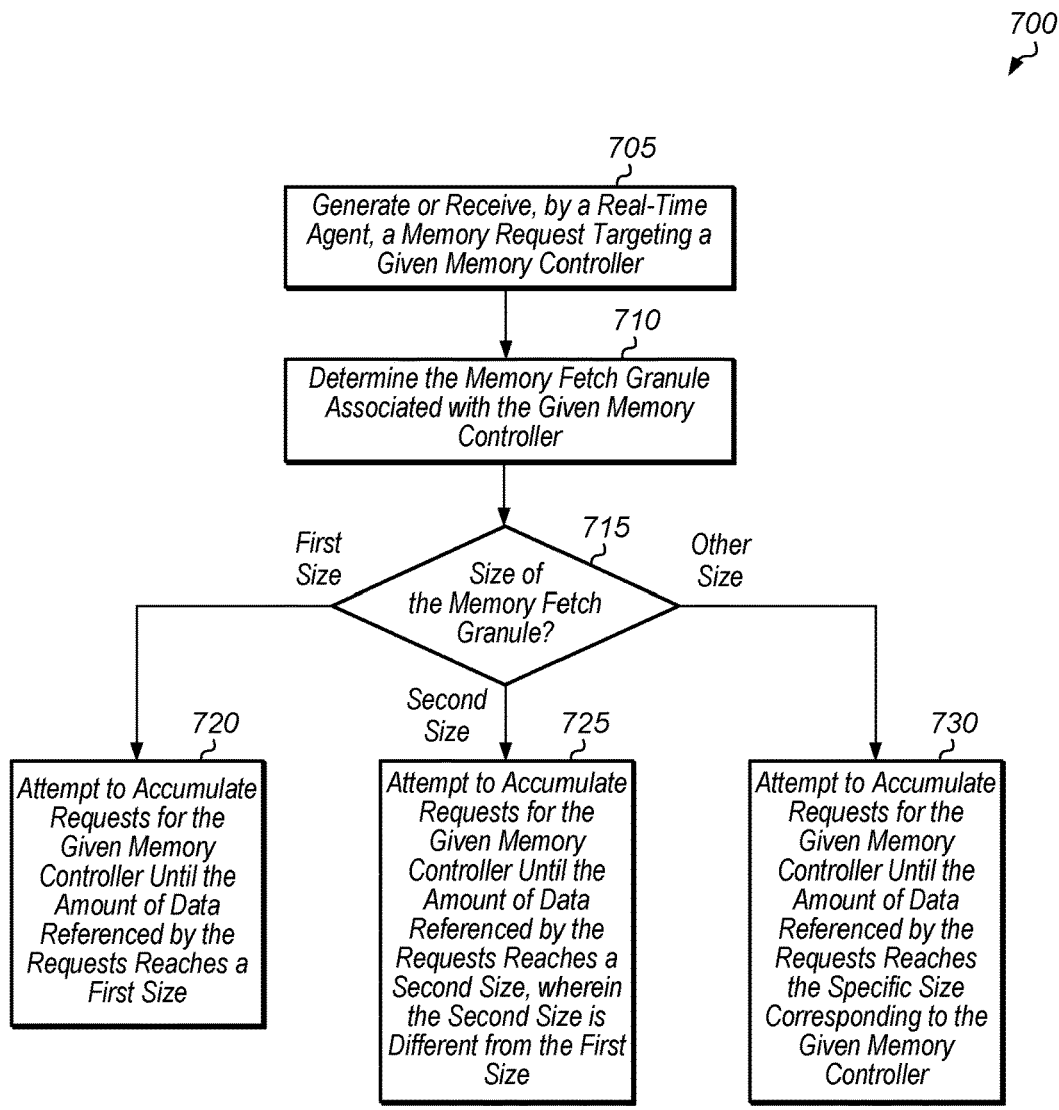
FIG. 7 is a flow diagram of one embodiment of a method for managing memory fetch granules for multiple memory controllers.

Turning now to FIG. 7, one embodiment of a method 700 for managing memory fetch granules for multiple memory controllers is shown. A real-time agent generates or receives a memory request targeting a given memory controller (block 705). In another embodiment, the agent is not classified as a real-time agent in that the agent generates or forwards a variety of different types of traffic, but the memory request is classified as a real-time request in this example. It is assumed for the purposes of this discussion that the system includes a plurality of memory controllers, with each memory controller coupled to one or more memory devices. Also, the system may also include a plurality of real-time agents, although only a single real-time agent is described in the context of the discussion of method 700. However, it should be understood that the other real-time agents in the system can behave in a similar manner to the real-time agent described in the discussion of method 700.

Next, the real-time agent determines the memory fetch granule associated with the given memory controller (block 710). In one embodiment, the real-time agent queries a MFG table to determine the memory fetch granule associated with the given memory controller. In other embodiments, the real-time agent uses other techniques to determine the memory fetch granule associated with the given memory controller. If the memory fetch granule is a first size (conditional block 715, "first size" leg), then the real-time agent attempts to accumulate requests for the given memory controller until the amount of data referenced by the requests reaches the first size (block 720). After block 720, method 700 ends. If the memory fetch granule is a second size (conditional block 715, "second size" leg), then the real-time agent attempts to accumulate requests for the given memory controller until the amount of data referenced by the requests reaches the second size, with the second size being different from the first size (block 725). After block 725, method 700 ends. If the memory fetch granule is another size (conditional block 715, "other size" leg), then the real-time agent attempts to accumulate requests for the given memory controller until the amount of data referenced by the requests reaches the specific size corresponding to the particular memory controller (block 730). After block 730, method 700 ends.

Figure 8:
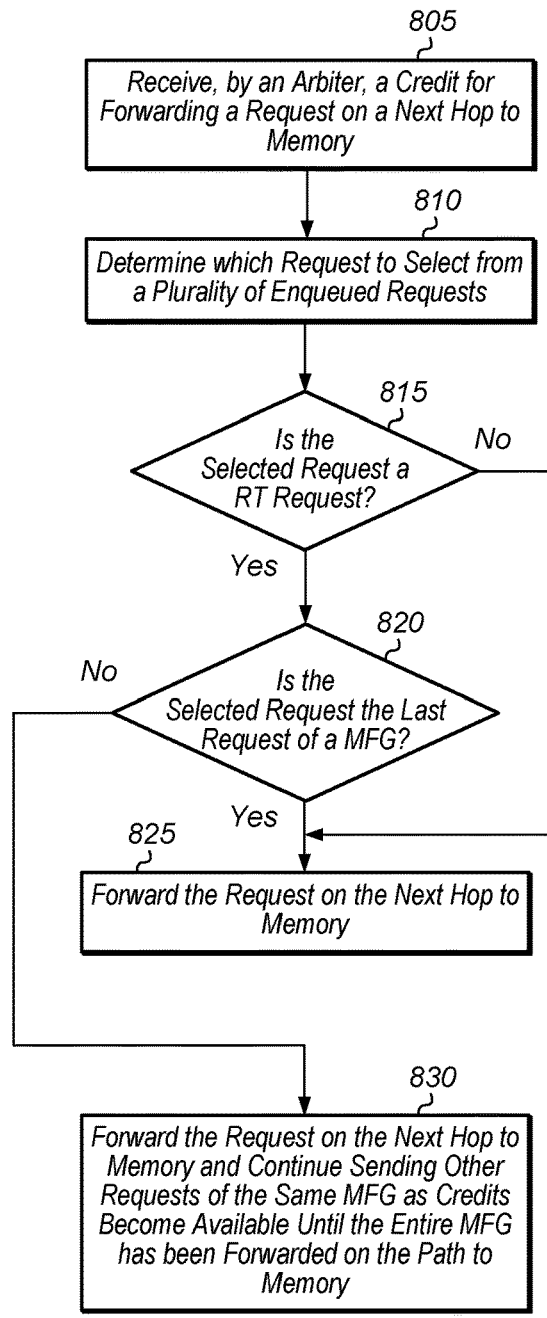
FIG. 8 is a flow diagram of one embodiment of a method for managing memory fetch granules for an arbiter forwarding a MFG.

Turning now to FIG. 8, one embodiment of a method 800 for an arbiter processing requests grouped into memory fetch granule sized chunks is shown. An arbiter receives a credit for forwarding a request on a next hop to memory (block 805). The arbiter may be located in any suitable location, such as within a communication fabric, within a memory controller, or in any other position within a system or apparatus. The arbiter determines which request to select from a plurality of enqueued requests (block 810). If the arbiter selects a RT request (conditional block 815, "yes" leg), then the arbiter checks the EoM flag to determine if this request is the last request of a MFG (conditional block 820). In one embodiment, the arbiter only selects a RT request if the entire MFG containing the RT request has already been received by the arbiter. If the arbiter selects a non-RT request (conditional block 815, "no" leg), then the arbiter forwards the request on the next hop to memory (block 825), and then method 800 ends.

If the RT request selected by the arbiter has the EoM flag set (conditional block 820, "yes" leg), then the arbiter forwards the request on the next hop to memory (block 825), and then method 800 ends. If the RT request selected by the arbiter does not have its EoM flag set (conditional block 820, "no" leg), then the arbiter forwards the request on the next hop to memory and continues selecting other requests of the same MFG as credits become available until the entire MFG has been forwarded on the path to memory (block 830). In other words, in block 830, the arbiter waits to select other requests for forwarding until the entire MFG has been forwarded on the path to memory. After block 830, method 800 ends.

Figure 9:
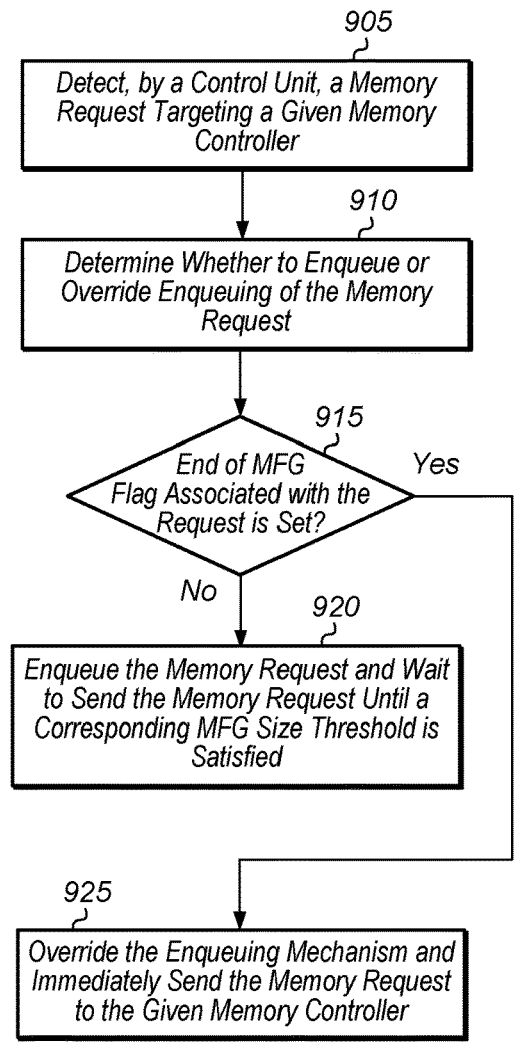
FIG. 9 is a flow diagram of one embodiment of a method for an agent enqueuing or overriding enqueuing of requests.

Referring now to FIG. 9, one embodiment of a method 900 for an agent enqueuing or overriding enqueuing of requests is shown. A control unit (e.g., control unit 215 of FIG. 2) of an agent (e.g., agent 210A) detects a memory request targeting a given memory controller (block 905). In response to detecting the memory request targeting the given memory controller, the control unit determines whether to enqueue the memory request or override the enqueuing of the memory request (block 910). Depending on the embodiment, the control unit uses any of various different techniques for determining whether to enqueue the memory request or override the queuing of the memory request. In one embodiment, the control unit uses the value of an end of MFG flag associated with the memory request to determine whether to queue the memory request or override the queuing of memory requests.

If an end of MFG flag associated with the memory request is not set (conditional block 915, "no" leg), then the control unit enqueues the memory request and waits to send the memory request until a corresponding MFG size threshold is satisfied (block 920). After block 920, method 900 ends. In one embodiment, the corresponding MFG size threshold is satisfied when the sum of sizes of data referenced by enqueued memory requests equals the size of the corresponding MFG size for the given memory controller. In one embodiment, the corresponding MFG size is a multiple of the memory request size. In another embodiment, the corresponding MFG size threshold is satisfied when the sum of sizes of data referenced by enqueued memory requests is closest to the corresponding MFG size without going over. In other embodiments, other ways of satisfying the corresponding MFG size threshold are possible and are contemplated.

If an end of MFG flag associated with the memory request is set (conditional block 915, "yes" leg), then the control unit overrides the enqueuing mechanism and immediately sends the memory request to the given memory controller (block 925). The control unit may also send other enqueued requests with the memory request in some cases. Alternatively, if there are no other enqueued requests, then the control unit sends the memory request by itself. After block 925, method 900 ends.

Figure 10:
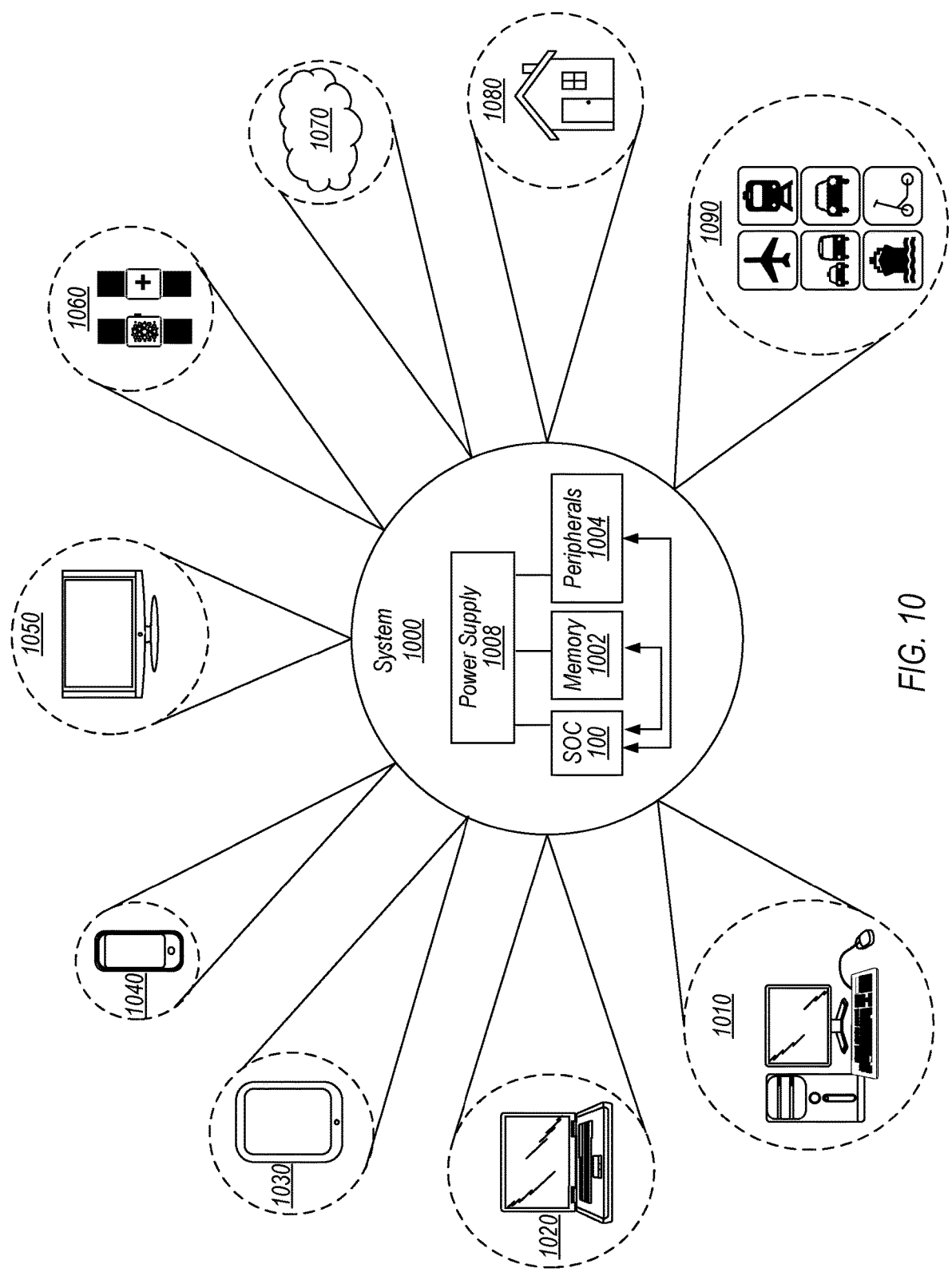
FIG. 10 is a block diagram of one embodiment of a system.

Referring now to FIG. 10, a block diagram of one embodiment of a system 1000 is shown that may incorporate and/or otherwise utilize the methods and mechanisms described herein. In the illustrated embodiment, the system 1000 includes at least a portion of SOC 100 (of FIG. 1)

which may include multiple types of processing units, such as a central processing unit (CPU), a graphics processing unit (GPU), or otherwise, a communication fabric, and interfaces to memories and input/output devices. In various embodiments, SoC 100 is coupled to external memory 1002, peripherals 1004, and power supply 1008.

A power supply 1008 is also provided which supplies the supply voltages to SoC 100 as well as one or more supply voltages to the memory 1002 and/or the peripherals 1004. In various embodiments, power supply 1008 represents a battery (e.g., a rechargeable battery in a smart phone, laptop or tablet computer, or other device). In some embodiments, more than one instance of SoC 100 is included (and more than one external memory 1002 may be included as well).

The memory 1002 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 1004 include any desired circuitry, depending on the type of system 1000. For example, in one embodiment, peripherals 1004 includes devices for various types of wireless communication, such as wifi, Bluetooth, cellular, global positioning system, etc. In some embodiments, the peripherals 1004 also include additional storage, including RAM storage, solid state storage, or disk storage. The peripherals 1004 include user interface devices such as a display screen, including touch display screens or multi-touch display screens, keyboard or other input devices, microphones, speakers, etc.

As illustrated, system 1000 is shown to have application in a wide range of areas. For example, system 1000 may be utilized as part of the chips, circuitry, components, etc., of a desktop computer 1010, laptop computer 1020, tablet computer 1030, cellular or mobile phone 1040, or television 1050 (or set-top box coupled to a television). Also illustrated is a smartwatch and health monitoring device 1060. In some embodiments, smartwatch may include a variety of general-purpose computing related functions. For example, smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1000 may further be used as part of a cloud-based service(s) 1070. For example, the previously mentioned devices, and/or other devices, may access computing resources in the cloud (i.e., remotely located hardware and/or software resources). Still further, system 1000 may be utilized in one or more devices of a home 1080 other than those previously mentioned. For example, appliances within the home 1080 may monitor and detect conditions that warrant attention. For example, various devices within the home 1080 (e.g., a refrigerator, a cooling system, etc.) may monitor the status of the device and provide an alert to the homeowner (or, for example, a repair facility) should a particular event be detected. Alternatively, a thermostat may monitor the temperature in the home 1080 and may automate adjustments to a heating/cooling system based on a history of responses to various conditions by the homeowner. Also illustrated in FIG. 10 is the application of system 1000 to various modes of transportation 1090. For example, system 1000 may be used in the control and/or entertainment systems of aircraft, trains, buses, cars for hire, private automobiles, waterborne vessels from private boats to cruise liners, scooters (for rent or owned), and so on. In various cases, system 1000 may be used to provide automated guidance (e.g., self-driving vehicles), general systems control, and otherwise. These and many other embodiments are possible and are contemplated. It is noted that the devices and applications illustrated in FIG. 10 are illustrative only and are not intended to be limiting. Other devices are possible and are contemplated.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
   one or more agents;
   a first memory controller configured to:
     define a first memory fetch granule for the one or more agents to use when forwarding real-time memory requests which target first memory coupled to the first memory controller, wherein the first memory fetch granule specifies an access granularity for the first memory;
     convey an indication of a size of the first memory fetch granule to the one or more agents;
   wherein a first agent, of the one or more agents, is configured to:
     receive the indication of the size of the first memory fetch granule;
     accumulate memory requests having a sequential access pattern which target the first memory coupled to the first memory controller until a sum of sizes of data referenced by the memory requests satisfies a first memory fetch granule size threshold; and
     send the memory requests to the first memory controller based at least in part on the sum of the sizes of data referenced by the memory requests satisfying the first memory fetch granule size threshold.

2. The apparatus as recited in claim 1, wherein the first agent is further configured to:
   tag, with an end of memory fetch granule flag, a last memory request in a group of memory requests based on the group of memory requests having a sequential access pattern and the sum of sizes of data referenced by the group satisfying the first memory fetch granule size threshold; and
   tag, with the end of memory fetch granule flag, a given memory request which does not correspond to a sequential access pattern even if the given memory request references an amount of data less than the size of the first memory fetch granule.

3. The apparatus as recited in claim 1, wherein a size of the first memory fetch granule corresponds to interleaving data across multiple banks located in different bank groups of memory devices coupled to the first memory controller.

4. The apparatus as recited in claim 1, further comprising a second memory controller which defines a second memory fetch granule different from the first memory fetch granule, wherein the second memory controller is configured to send an indication of a size of the second memory fetch granule to the one or more agents.

5. The apparatus as recited in claim 4, wherein the first agent is further configured to accumulate a second group of memory requests targeting second memory coupled to the second memory controller until a sum of data referenced by the second group of memory requests satisfies a second memory fetch granule size threshold.

6. The apparatus as recited in claim 1, wherein the first agent is further configured to store the indication of the size of the first memory fetch granule in a memory fetch granule table.

7. The apparatus as recited in claim 1, further comprising a first arbiter, wherein the first memory controller is configured to send an indication of the size of the first memory fetch granule to the first arbiter, and wherein the first arbiter is configured to:
   accumulate real-time requests from the first agent targeting the first memory coupled to the first memory controller until a sum of sizes of data referenced by the memory requests satisfies the first memory fetch granule size threshold;
   determine if a given memory request, selected as a winner of arbitration, is a last memory request of a given memory fetch granule; and
   if the given memory request is not the last memory request of the given memory fetch granule, forward the given memory request of the given memory fetch granule to the first memory controller and continue sending other memory requests of the given memory fetch granule as credits become available until an entirety of the given memory fetch granule has been forwarded on a path to the first memory controller.

8. The apparatus as recited in claim 7, wherein after forwarding the given memory request on the path to the first memory controller, the first arbiter is configured to prevent memory requests of other memory fetch granules from being eligible for arbitration until the entirety of the given memory fetch granule has been forwarded on the path to the first memory controller.

9. The apparatus as recited in claim 1, wherein the first memory fetch granule is dependent on a dynamic-random access memory (DRAM) technology of memory devices coupled to the first memory controller.

10. A method comprising:
    defining, by a first memory controller, a first memory fetch granule for one or more agents to use when forwarding real-time memory requests which target first memory coupled to the first memory controller, wherein the first memory fetch granule specifies an access granularity for the first memory;
    conveying an indication of a size of the first memory fetch granule to the one or more agents;
    receiving, by a first agent of the one or more agents, the indication of the size of the first memory fetch granule;
    accumulating, by the first agent, memory requests having a sequential access pattern which target the first memory coupled to the first memory controller until a sum of sizes of data referenced by the memory requests satisfies a first memory fetch granule size threshold; and
    sending, by the first agent, the memory requests to the first memory controller based at least in part on the sum of the sizes of data referenced by the memory requests satisfying the first memory fetch granule size threshold.

11. The method as recited in claim 10, further comprising the first agent tagging, with an end of memory fetch granule flag, a last memory request in a group of memory requests based on the group of memory requests having a sequential access pattern and the sum of sizes of data referenced by the group satisfying the first memory fetch granule size threshold.

12. The method as recited in claim 10, further comprising the first agent tagging, with an end of memory fetch granule flag, a given memory request which does not correspond to a sequential access pattern even if the given memory request references an amount of data less than the size of the first memory fetch granule.

13. The method as recited in claim 10, wherein a size of the first memory fetch granule corresponds to interleaving data across multiple banks located in different bank groups of memory devices coupled to the first memory controller.

14. The method as recited in claim 10, further comprising a second memory controller sending an indication of a size of the second memory fetch granule to the one or more agents, wherein the second memory fetch granule is different from the first memory fetch granule.

15. The method as recited in claim 14, further comprising the first agent accumulating a second group of memory requests targeting second memory coupled to the second memory controller until a sum of data referenced by the second group of memory requests satisfies a second memory fetch granule size threshold.

16. A system comprising:
one or more agents;
a first arbiter; and
a first memory controller configured to:
define a first memory fetch granule for the one or more agents to use when forwarding real-time memory requests which target first memory coupled to the first memory controller, wherein the first memory fetch granule specifies an access granularity for the first memory;
convey an indication of a size of the first memory fetch granule to the one or more agents and the first arbiter; and
wherein a first agent, of the one or more agents, is configured to:
receive the indication of the size of the first memory fetch granule;
accumulate memory requests having a sequential access pattern which target the first memory coupled to the first memory controller until a sum of sizes of data referenced by the memory requests satisfies a first memory fetch granule size threshold; and
send the memory requests to the first memory controller based at least in part on the sum of the sizes of data referenced by the memory requests satisfying the first memory fetch granule size threshold;
wherein the first arbiter is configured to:
accumulate real-time requests from the first agent targeting the first memory coupled to the first memory controller until a sum of sizes of data referenced by the memory requests satisfies the first memory fetch granule size threshold;
determine if a given memory request, selected as a winner of arbitration, is a last memory request of a given memory fetch granule; and
if the given memory request is not the last memory request of the given memory fetch granule, forward the given memory request of the given memory fetch granule to the first memory controller and continue sending other memory requests of the given memory fetch granule as credits become available until an entirety of the given memory fetch granule has been forwarded on a path to the first memory controller.

17. The system as recited in claim 16, wherein after forwarding the given memory request on the path to the first memory controller, the first arbiter is configured to prevent memory requests of other memory fetch granules from being eligible for arbitration until the entirety of the given memory fetch granule has been forwarded on the path to the first memory controller.

18. The system as recited in claim 16, wherein the first memory fetch granule is dependent on a dynamic-random access memory (DRAM) technology of memory devices coupled to the first memory controller.

19. The system as recited in claim 16, wherein the first agent is further configured to store the indication of the size of the first memory fetch granule in a memory fetch granule table.

20. The system as recited in claim 19, wherein the first agent is further configured to store, in the memory fetch granule table, a plurality of indications of sizes of a plurality of different memory fetch granules corresponding to different memory controllers.

* * * * *